United States Patent
Mehr et al.

(10) Patent No.: US 8,565,952 B2
(45) Date of Patent: Oct. 22, 2013

(54) FORWARD-LOOKING HYBRID VEHICLE CONTROL STRATEGY

(75) Inventors: Daniel K. Mehr, Wixom, MI (US); Matthew Simonini, Milford, MI (US); Paul S. Lombardo, Commerce Township, MI (US); Christopher M. Haliburton, Commerce Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 221 days.

(21) Appl. No.: 13/112,008

(22) Filed: May 20, 2011

(65) Prior Publication Data

US 2012/0296502 A1    Nov. 22, 2012

(51) Int. Cl.
*B60L 11/00*    (2006.01)
*B60W 10/24*    (2006.01)

(52) U.S. Cl.
CPC .............. *B60L 11/00* (2013.01); *B60W 10/24* (2013.01)
USPC .................... 701/22; 180/65.29; 180/65.275; 180/65.265

(58) Field of Classification Search
USPC ................... 701/22, 119, 532; 180/65.1–65.8
See application file for complete search history.

(56) References Cited

U.S. PATENT DOCUMENTS

| | | | | |
|---|---|---|---|---|
| 7,849,944 | B2* | 12/2010 | DeVault | 180/65.29 |
| 8,190,318 | B2* | 5/2012 | Li et al. | 701/22 |
| 8,229,615 | B2* | 7/2012 | Sakamoto et al. | 701/22 |
| 2002/0188387 | A1* | 12/2002 | Woestman et al. | 701/22 |
| 2005/0228553 | A1* | 10/2005 | Tryon | 701/22 |
| 2009/0288896 | A1* | 11/2009 | Ichikawa | 180/65.265 |
| 2010/0161166 | A1* | 6/2010 | Yamada et al. | 701/22 |
| 2010/0305799 | A1* | 12/2010 | Yamada et al. | 701/22 |
| 2011/0022255 | A1* | 1/2011 | Yamada et al. | 701/22 |
| 2011/0166732 | A1* | 7/2011 | Yu et al. | 701/22 |
| 2011/0307166 | A1* | 12/2011 | Hiestermann et al. | 701/119 |
| 2012/0035795 | A1* | 2/2012 | Yu et al. | 701/22 |

OTHER PUBLICATIONS

A. Halvai Niasar, H. Moghbelli, A Vahedi; "Design Methodology of Drive Train for a Series-Parallel Hybrid Electric Vehicle (SP-HEV) and its Power Flow Control Strategy", 2005, pp. 1549-1554, University of Michigan Library 0-7803-8987-05/05.

P. Tulpule, V. Marano, G Rizzoni, "Effects of Different PHEV Control Strategies on Vehicle Performance", American Control Conference, Jun. 10-12, 2009, pp. 3950-3955, 978-1-4244-4524-0/09.

(Continued)

*Primary Examiner* — Thomas Tarcza
*Assistant Examiner* — Tyler J Lee
(74) *Attorney, Agent, or Firm* — Quinn Law Group, PLLC

(57) ABSTRACT

A vehicle includes an engine, a power source, and a motor. The power source outputs electrical energy in accordance with an actual state of charge, and the motor generates electrical energy when provided with torque from the engine. A position sensor generates a route signal representing drive cycle data between a present location of the vehicle and a selected destination. A controller determines a reference state of charge of the power source at the present location from the drive cycle data and commands the engine to charge the power source if the actual state of charge is below the reference state of charge determined for the present location. A method includes receiving the selected destination, generating the route signal, determining the reference state of charge from the drive cycle data, and commanding the engine to charge the power source in accordance with the reference state of charge.

17 Claims, 1 Drawing Sheet

(56) References Cited

OTHER PUBLICATIONS

J. D. Gonder "Route-Based Control of Hybrid Electric Vehicles", Conference Paper NREL/CP-540-42557, Jan. 2008.
Qiuming Gong, Yaoyu Li, Zhong-Ren Peng, "Trip Based Optimal Power Management of Plug-in Hybrid Electric Vehicles Using Gas-Kinetic Traffic Flow Model", American Control Conference, Jun. 11-13, 2008, pp. 3225-3230, 978-1-4244-2079-7/08.
Dominik Karbowski, Aymeric Rousseau, Sylvain Pagerit, Phillip Sharer, "Plug-In Vehicle Control Strategy: From Global Optimization to Real-Time Application".
Scott J. Moura, Duncan S. Callaway, Hosam K. Fathy, Jeffrey L. Stein, "A Stochastic Optimal Control Approach for Power Management in Plug-In Hybrid Electric Vehicles".

\* cited by examiner

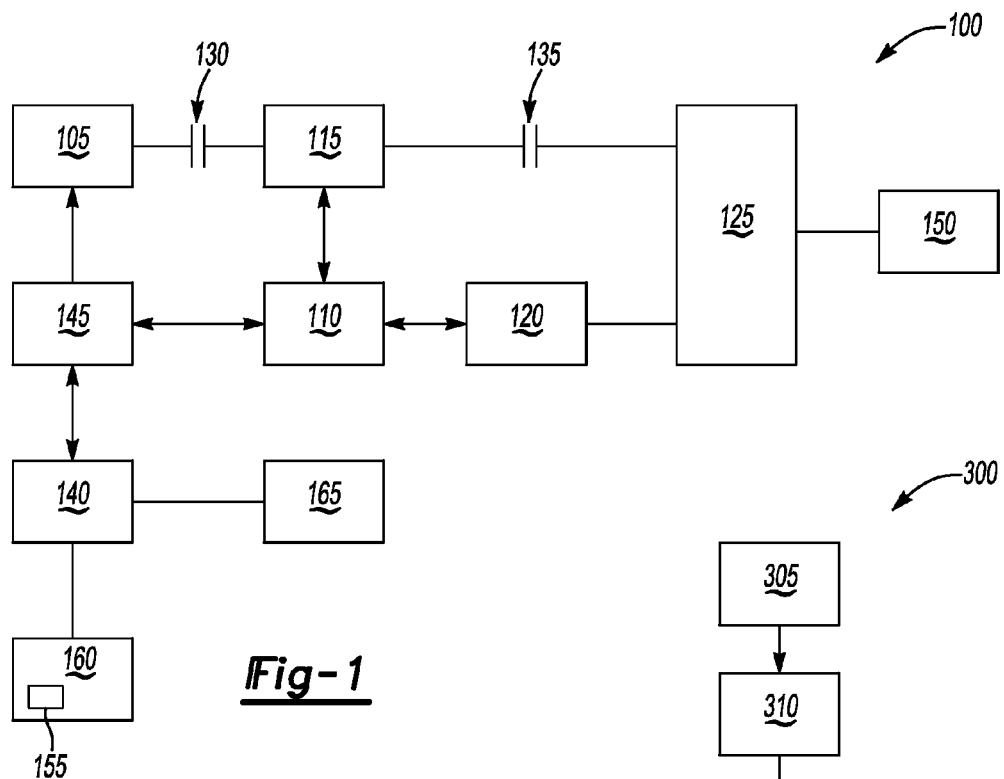
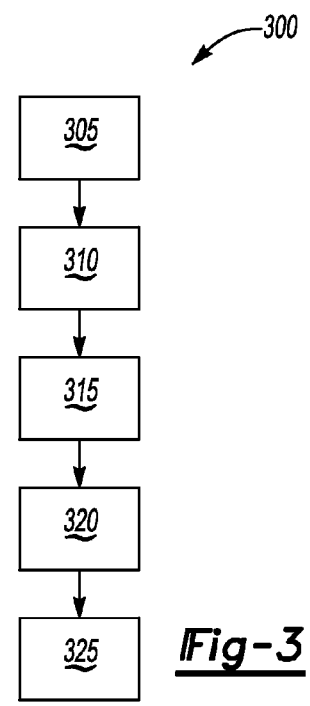
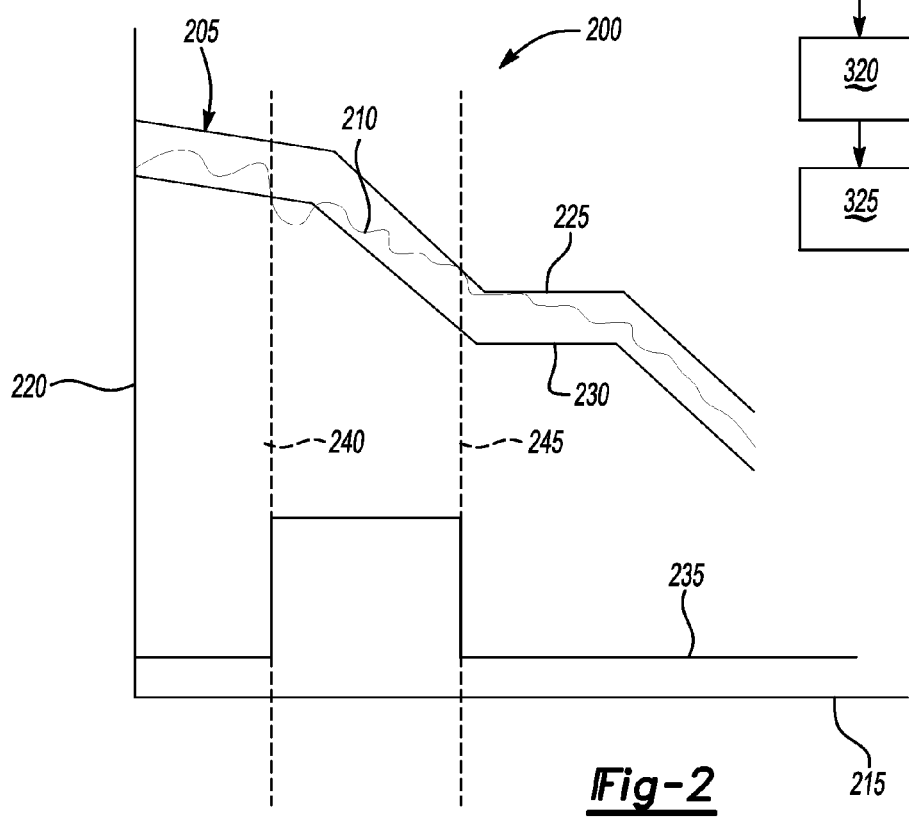

FORWARD-LOOKING HYBRID VEHICLE CONTROL STRATEGY

TECHNICAL FIELD

The disclosure relates to a forward-looking control strategy for a hybrid vehicle.

BACKGROUND

Hybrid vehicles have an engine and an electric motor that are each controlled to generate a torque. In some hybrid vehicles, the engine, the motor, or both, can provide torque to propel the vehicle. In other hybrid vehicles, the engine may provide torque that causes a generator to produce electrical energy that can be stored in a battery while the torque to propel the vehicle comes from the motor. The operation of the engine, the motor, or both, may be dictated by a control strategy implemented by the hybrid vehicle.

SUMMARY

An example vehicle includes an engine, a power source, a motor, a position sensor, and a controller. The engine is configured to generate an engine torque, and the power source is configured to output electrical energy in accordance with an actual state of charge. The motor is configured to receive electrical energy from the power source, generate a motor torque in accordance with the electrical energy received, and generate electrical energy when provided with the engine torque. The position sensor is configured to generate a route signal representing drive cycle data between a present location of the vehicle and a selected destination. The controller is in communication with the position sensor and is configured to receive the route signal generated by the position sensor, determine a reference state of charge of the power source at the present location from the drive cycle data, and command the engine to charge the power source if the actual state of charge is below the reference state of charge determined for the present location.

An example method includes receiving a selected destination for the hybrid vehicle and generating a route signal representing drive cycle data between a present location of the hybrid vehicle and the selected destination. The method further includes determining a reference state of charge for the present location from the drive cycle data and commanding the engine to charge the power source in accordance with the reference state of charge determined for the present location.

The above features and the advantages of the present disclosure are readily apparent from the following detailed description of the best modes for carrying out the invention when taken in connection with the accompanying drawings.

BRIEF DESCRIPTION OF THE DRAWINGS

FIG. 1 is a schematic diagram of an example hybrid vehicle having a controller configured to implement a control strategy in accordance with a reference state of charge.

FIG. 2 illustrates an example graph of an actual state of charge, the reference state of charge, and control signals at various times along a route.

FIG. 3 illustrates a flowchart of an example process that may be used to implement a hybrid vehicle control strategy.

DETAILED DESCRIPTION

A vehicle is configured to implement a control strategy to charge a power source, such as a battery, based on drive cycle information. The vehicle may take many different forms and include multiple and/or alternate components and facilities. While an example vehicle is shown in the Figures, the components illustrated in the Figures are not intended to be limiting. Indeed, additional or alternative components and/or implementations may be used.

FIG. 1 illustrates an example vehicle 100 that includes an engine 105, a power source 110, a first motor 115, a second motor 120, a gearbox 125, a first clutch 130, a second clutch 135, a position sensor 140, and a controller 145. The vehicle 100 may be any passenger or commercial automobile such as a hybrid vehicle including a plug-in hybrid electric vehicle (PHEV), an extended range electric vehicle (EREV), or the like.

The engine 105 may include any device configured to generate an engine torque by converting a mixture of fuel and air into rotational motion. For example, the engine 105 may be an internal combustion engine that generates rotational motion via a thermodynamic cycle, such as an Otto cycle, a Diesel cycle, etc. The engine torque may be used to propel the vehicle 100, or in some instances, may be used to drive a generator. An engine control unit (not shown) may control the amount of torque generated by the engine 105.

The power source 110 may include any device configured to output electrical energy in accordance with a state of charge. The term "actual state of charge," therefore, may represent the amount of electrical energy that is available from the power source 110 at a particular time, while the term "reference state of charge" may refer to a desired state of charge of the battery at a particular time. The power source 110 may, in one possible implementation, be a battery having one or more electrochemical cells that can store electrical energy. The power source 110 may be configured to output electrical energy as direct current (DC) energy, and to provide electrical energy to devices that operate on alternating current (AC) energy, an inverter (not shown) may convert DC energy output by the power source 110 into AC energy.

The first motor 115 may include any device configured to generate a first motor torque by converting electrical energy, such as AC energy, into rotational motion. The amount of torque generated may be in accordance with the amount of electrical energy received. In some instances, the first motor 115 may be configured to generate electrical energy that may be stored in the power source 110. For example, the first motor 115, when provided with a torque, such as the engine torque, may generate AC energy. The AC energy generated by the first motor 115 may be converted into DC energy by a rectifier (not shown) and stored in the power source 110 to, for instance, increase the actual state of charge of the power source 110. Like the first motor 115, the second motor 120 may also include any device configured to generate a torque (e.g., a second motor torque) in accordance with electrical energy received. Both the first motor torque and the second motor torque may be used to propel the vehicle 100.

The gearbox 125 may include any device configured to transfer a received torque into a propulsion torque to wheels 150 that may be used to propel the vehicle 100. The gearbox 125 may include one or more sets of gears that, when engaged, convert the received torque into the propulsion torque. Various clutches (not shown) may be used to change the configuration of the gearbox 125 (e.g., the engagement of the gears) to control the amount of torque provided to the wheels 150.

The first clutch 130 and the second clutch 135 may each include any device configured to engage to transfer torque. For instance, the first clutch 130 and the second clutch 135 may each include a driving mechanism and a driven mechanism that are each configured to rotate at the same speed when engaged or at different speeds when disengaged. That is, when engaged, the torque provided to the driving mechanism may be imparted to the driven mechanism. As illustrated in FIG. 1, the first clutch 130 is operably disposed between the engine 105 and the first motor 115 so that, e.g., the first motor 115 may be selectively coupled to the engine 105 to receive the engine torque. The second clutch 135, as illustrated, is operably disposed between the first motor 115 and the gearbox 125 so that the gearbox 125 may be selectively coupled to the first motor 115 to receive the first motor torque, the engine torque, or a combination of both.

The position sensor 140 may include any device configured to determine a present, geographic location of the vehicle 100 using a navigation system, such as the Global Positioning System (GPS). For instance, the position sensor 140 may determine the present location by triangulating a distance between the vehicle 100 and various landmarks, such as satellites. Moreover, the position sensor 140 may be configured to identify a route between the present location and a destination.

In one possible approach, the position sensor 140 may include a user interface 155 that may be presented to a user via a display device 160. Through the user interface 155, the position sensor 140 may be configured to prompt the user, such as a driver of the vehicle 100, to select an intended destination. The user may select the destination and communicate with the user interface 155 via an input device 165. The display device 160 and the input device 165 may be located, for instance, in a passenger compartment of the vehicle 100. Moreover, the display device 160 and the input device 165 may be integrated into a single device, such as a touch screen display.

In response to receiving the selection from the user, the position sensor 140 may generate a route between the present location and the selected destination. The position sensor 140 may be configured to further identify drive cycle data, such as speed limits, rolling resistances, and road grades, etc., at various locations along the route. The position sensor 140 may be configured to generate and output a route signal that represents the drive cycle data between the present location and the selected destination.

The controller 145 may include any device configured to determine the reference state of charge of the power source 110 given the drive cycle data at the present location of the vehicle 100 as represented by the route signal. The controller 145, as illustrated in FIG. 1, is in communication with the position sensor 140 to receive the route signal. From the drive cycle data represented by the route signal, the controller 145 may determine the reference state of charge of the power source 110 for the present location of the vehicle 100.

The controller 145 may be further configured to command the engine 105 to charge the power source 110 in accordance with the reference state of charge. For instance, the controller 145 may generate one or more control signals that cause the engine 105 to generate the engine torque and that cause the first clutch 130 to engage so that the first motor 115 can receive the engine torque and generate electrical energy in accordance with the engine torque received. The controller 145 may command the engine 105, either directly or indirectly via the engine control unit, to continue to generate torque until the actual state of charge is substantially equal to or greater than the reference state of charge. The controller 145 may further generate one or more control signals that cause the engine 105 to stop charging the power source 110. Therefore, the control signals may cause the engine 105 to stop producing the engine torque or cause the first clutch 130 to disengage so that no torque is transferred to the first motor 115.

To determine the reference state of charge, the controller 145 may, in one possible approach, predict a total load energy from the drive cycle data. The total load energy may be the amount of electrical energy needed from the power source 110 to allow the vehicle 100 to travel from the present location to the selected destination. In addition, the controller 145 may be configured to determine an accumulated load energy from the drive cycle data. The accumulated load energy may be the amount of energy that has been expended by the power source 110 between the beginning of the route and the present location. Both the total load energy and the accumulated load energy can be expressed by Equation (1), below.

$$E \int_0^\tau \left[\frac{1}{2} A\rho C_D V^2 + C_R Mg + G_r Mg \right] d\tau \qquad (1)$$

In Equation 1, A represents the cross-sectional area of the vehicle 100, represents air density, $C_D$ may represent an aerodynamic constant, and V may represent the velocity of the vehicle 100. The term $C_R$ may represent a rolling resistance constant, M may represent the mass of the vehicle 100, g may represent gravity, and $G_r$ may represent the grade of the road. Some of these terms are constants that may be specific to the vehicle 100 while other terms, such as the velocity (V) and the road grade ($G_r$) may be determined from the drive cycle data represented by the route signal generated by the position sensor 140. To determine the total load energy, may represent the estimated amount of time for the hybrid vehicle 100 to travel from the beginning of the route (e.g., where is equal to 0) to the selected destination. For the accumulated load energy, however, may represent the amount of time that has elapsed since the beginning of the route (e.g., the amount of time it took for the vehicle 100 to get to the present location).

To calculate the reference state of charge, the controller 145 may apply a ratio of the accumulated load energy to the total load energy to a difference between an initial state of charge (e.g., the state of charge at the beginning of the route) and a minimum allowable state of charge. Equation (2), below, illustrates an example equation that the controller 145 may use to determine the reference state of charge.

$$SOC_{ref} = SOC_{init} - \left[\frac{E_{accum}}{E_{total}} \times (SOC_{init} - SOC_{min})\right] \qquad (2)$$

In Equation (2), $SOC_{ref}$ represents the reference state of charge, $SOC_{init}$ represents the initial state of charge, $E_{accum}$ represents the accumulated load energy, $E_{total}$ represents the total load energy, and $SOC_{min}$ represents the minimum allowable state of charge.

In one possible implementation, the reference state of charge may be defined by a range, such as a maximum state of charge and a minimum state of charge. The controller 145, therefore, may be configured to command the engine 105 to charge the power source 110 in light of the maximum and minimum state of charge. That is, the controller 145 may be configured to generate a control signal that enables the engine 105 to charge the power source 110 when the actual state of charge falls below the minimum state of charge and that disables the engine 105 when the actual state of charge is substantially equal to or greater than the maximum state of charge. In addition, the controller 145 may generate one or more control signals that cause the first clutch 130 to engage so that the engine torque may be transferred to the motor 115, and thus, cause the motor 115 to generate electrical energy.

In one possible approach, the controller 145 may be configured to calculate the maximum state of charge using Equation (2) or another equation. The minimum state of charge may be a predetermined factor (e.g., 1%, 5%, 10%, etc.) below the maximum state of charge. Similarly, the controller 145 may use Equation (2) to calculate the minimum state of charge and determine the maximum state of charge to be a predetermined factor above the minimum state of charge. Alternatively, the controller 145 may calculate the reference state of charge as discussed above and calculate the maximum state of charge to be a predetermined factor above the reference state of charge and the minimum state of charge to be a predetermined factor below the reference state of charge.

In general, computing systems and/or devices, such as the position sensor 140, the controller 145, the engine control unit (not shown), etc., may employ any of a number of computer operating systems and may include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

FIG. 2 illustrates an example graph 200 of the reference state of charge 205 and the actual state of charge 210 of the power source 110 at various times as the vehicle 100 drives along an example route. The x-axis 215 represents time and the y-axis 220 represents the state of charge. As illustrated, the reference state of charge 205 is defined by a range, including the maximum state of charge 225 and the minimum state of charge 230, discussed above. The controller 145 may compare the actual state of charge 210 to the maximum state of charge 225 and minimum state of charge 230 at various times along the route. If the actual state of charge 210 falls below the minimum state of charge 230, the controller 145 may generate one or more control signals 235 that, when high for instance, engage the first clutch 130, cause the engine 105 to produce the engine torque, or both. With the first clutch 130 engaged, the engine 105 may provide the engine torque to the first motor 115, which in turn may generate electrical energy that may be stored in the power source 110, and thus, increase the actual state of charge 210 of the power source 110. When the actual state of charge 210 is substantially equal to or greater than the maximum state of charge 225, the controller 145 may disable the engine 105, disengage the first clutch 130, or both, using one or more of the control signals 235.

As illustrated in the graph 200 of FIG. 2, the actual state of charge 210 falls below the minimum state of charge 230 at the time designated by the dashed line 240. The controller 145, therefore, generates the control signal 235 with a high value to control the engine 105 to charge the power source 110. At the time designated by the dashed line 245, the actual state of charge 210 is substantially equal to the maximum state of charge 225 so the controller 145 disables the engine 105 and/or disengages the first clutch 130 by dropping the control signal 235 to a low value.

FIG. 3 illustrates a flowchart of an example process 300 that may be executed by one or more vehicle 100 components, such as the controller 145 and the position sensor 140, to implement a control strategy in accordance with drive cycle data.

At block 305, the position sensor 140 may determine the present location of the vehicle 100. For instance, the position sensor 140 may use a navigation system, such as the Global Positioning System (GPS), to triangulate the location of the vehicle 100 based on the distance of the vehicle 100 to multiple landmarks, such as satellites.

At block 310, the position sensor 140 may receive the selected destination from the user via the user interface 155. In one possible approach, the position sensor 140 may prompt the user, via the user interface 155, to select the destination. The user may use the input device 165 in the passenger compartment of the vehicle 100 to communicate the selected destination to the position sensor 140.

At block 315, the position sensor 140 may generate the route signal that represents drive cycle data between the present location of the vehicle 100 determined at block 305 and the selected destination from block 310. As discussed above, the drive cycle data may represent the speed limit, rolling resistance, and grade of the roads on which the vehicle 100 will travel between the present location and the selected destination.

At block 320, the controller 145 may determine a reference state of charge for the present location from the drive cycle data. That is, the controller 145 may determine the reference state of charge based on a ratio of the accumulated load energy and the predicted total load energy, as discussed above with respect to FIG. 1 and Equations (1) and (2). Since the accumulated load energy and the total load energy consider the drive cycle data, the reference state of charge is at least partially based upon, e.g., the speed limit, the road grade, and the rolling resistance, etc., at the present location.

At block 325, the controller 145 may command the engine 105 to charge the power source 110 in accordance with the reference state of charge determined for the present location. For example, if the reference state of charge is defined by a range (e.g., the maximum state of charge and the minimum state of charge, discussed above), at block 325, the controller 145 may command the engine 105 to charge the power source 110 if the actual state of charge is below the minimum state of charge. Moreover, the controller 145 may command the engine 105 to stop charging the power source 110 if the actual state of charge is substantially equal to or greater than the maximum state of charge. As discussed above, the controller 145 may generate one or more control signals that, directly or indirectly, cause the engine 105 to generate the engine torque, engage the first clutch 130 to provide the engine torque to the first motor 115, or both.

The process 300 may end after block 325.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
an engine configured to generate an engine torque;
a power source configured to output electrical energy in accordance with an actual state of charge;
a motor selectively coupled to the engine and configured to receive electrical energy from the power source, generate a motor torque in accordance with the electrical energy received, and generate electrical energy when provided with the engine torque;
a position sensor configured to generate a route from a present location of the vehicle to a selected destination, and generate a route signal representing drive cycle data for the route, wherein the drive cycle data includes speed limits at various locations along the route, rolling resistances at various locations along the route, and road grades at various locations along the route; and
a controller in communication with the position sensor and configured to receive the route signal generated by the position sensor and representing the drive cycle data of the route, determine a reference state of charge of the power source at the present location from the drive cycle data, and command the engine to charge the power source if the actual state of charge is below the reference state of charge determined for the present location;
wherein the controller is operable to determine the reference state of charge from a ratio of an accumulated load energy relative to a total load energy; and
wherein the controller is operable to predict the total load energy and determine the accumulated load energy from the following equation using the drive cycle data:

$$E \int_0^\tau \left[ \frac{1}{2} A \rho C_D V^2 + C_R M g + G_r M g \right] d\tau$$

wherein E represents energy (either the total load energy or the accumulated load energy), A represents the cross-sectional area of the vehicle, ρ represents air density, $C_D$ represents an aerodynamic constant, V represents the velocity of the vehicle $C_R$ represents a rolling resistance constant, M represents the mass of the vehicle, g represents gravity, and $G_r$ represents the grade of the road, and t represents time.

2. The vehicle as set forth in claim 1, further comprising a clutch operably disposed between the engine and the motor to selectively couple the engine to the motor.

3. The vehicle as set forth in claim 1, wherein the reference state of charge includes a maximum state of charge and a minimum state of charge, and wherein the controller is configured to enable the engine to charge the power source if the actual state of charge is below the minimum state of charge.

4. The vehicle as set forth in claim 3, wherein the controller is configured to command the engine to stop charging the power source if the actual state of charge is substantially equal to or greater than the maximum state of charge.

5. The vehicle as set forth in claim 1, wherein the position sensor includes a user interface configured to receive a selection from a user.

6. The vehicle as set forth in claim 5, wherein the user interface is configured to present the user with a prompt to select a destination, and wherein the position sensor is configured to generate the route signal in accordance with the destination selected by the user.

7. The vehicle as set forth in claim 1, wherein the position sensor is configured to determine the present location.

8. The vehicle as set forth in claim 1, wherein the drive cycle data includes one or more of a speed limit, a road grade, and a rolling resistance.

9. A method of controlling an engine to charge a power source in a hybrid vehicle, the method comprising:
receiving, via a user interface, a selected destination for the hybrid vehicle;
generating a route signal representing drive cycle data between a present location of the hybrid vehicle and the selected destination, wherein the drive cycle data includes speed limits at various locations along the route, rolling resistances at various locations along the route, and road grades at various locations along the route;
determining a reference state of charge for the present location from the drive cycle data from a ratio of an accumulated load energy relative to a total load energy, wherein the total load energy and the accumulated load energy are calculated from the following equation using the drive cycle data:

$$E \int_0^\tau \left[ \frac{1}{2} A \rho C_D V^2 + C_R M g + G_r M g \right] d\tau$$

wherein E represents energy (either the total load energy or the accumulated load energy), A represents the cross-sectional area of the vehicle, ρ represents air density, $C_D$ represents an aerodynamic constant V represents the velocity of the vehicle, $C_R$ represents a rolling resistance constant, M represents the mass of the vehicle, g represents gravity, and $G_r$ represents the grade of the road, and t represents time; and
commanding the engine to charge the power source in accordance with the reference state of charge determined for the present location.

10. The method as set forth in claim 9, wherein the power source is configured to output electrical energy in accordance with an actual state of charge and wherein the reference state of charge includes a maximum state of charge and a minimum state of charge; and
wherein commanding the engine to charge the power source in accordance with the reference state of charge includes commanding the engine to charge the power source if the actual state of charge is below the minimum state of charge.

11. The method as set forth in claim 10, wherein commanding the engine to charge the power source in accordance with the reference state of charge includes commanding the engine to stop charging the power source if the actual state of charge is substantially equal to or greater than the maximum state of charge.

12. The method as set forth in claim 9, further comprising determining the present location of the hybrid vehicle via a position sensor.

13. The method as set forth in claim 9, wherein determining the reference state of charge for the present location from the drive cycle data includes determining the reference state of charge for the present location based at least in part on one or more of a speed limit, a road grade, and a rolling resistance of the present location.

14. A vehicle comprising:
an engine configured to generate an engine torque;
a power source configured to output electrical energy in accordance with an actual state of charge;
a motor selectively coupled to the engine and configured to receive electrical energy from the power source, generate a motor torque in accordance with the electrical energy received, and generate electrical energy when coupled to the engine, wherein the motor is selectively coupled to the engine to receive the engine torque and generate electrical energy in accordance with the engine torque received;
a position sensor having a user interface and configured to prompt a user to select a destination, determine a present location, generate a route signal representing drive cycle data between the present location of the vehicle and a selected destination, wherein the drive cycle data includes at least one of a speed limit, a road grade, and a rolling resistance at the present location; and
a controller in communication with the position sensor and configured to receive the route signal and determine a reference state of charge of the power source at the present location based at least in part on a ratio of an accumulated load energy determined from the drive cycle data and a total load energy determined from the drive cycle data, wherein the reference state of charge is defined by at least one of a maximum state of charge and a minimum state of charge;
wherein the controller is operable to predict the total load energy and determine the accumulated load energy from the following equation using the drive cycle data:

$$E \int_0^\tau \left[ \frac{1}{2} A \rho C_D V^2 + C_R M g + G_r M g \right] d\tau$$

wherein E represents energy (either the total load energy or the accumulated load energy), A represents the cross-sectional area of the vehicle, p represents air density, $C_D$ represents an aerodynamic constant, V represents the velocity of the vehicle, $C_R$ represents a rolling resistance constant, M represents the mass of the vehicle, g represents gravity, and $G_r$ represents the grade of the road, and t represents time and wherein the controller is configured to command the engine to charge the power source if the actual state of charge is below the minimum state of charge determined for the present location and command the engine to stop charging the power source if the actual state of charge is substantially equal to or greater than the maximum state of charge.

15. A vehicle as set forth in claim 1 wherein the controller is operable to calculate the reference state of charge from the following equation:

$$SOC_{ref} = SOC_{init} - \left[ \frac{E_{accum}}{E_{total}} \times (SOC_{init} - SOC_{min}) \right]$$

wherein $SOC_{ref}$ represents the reference state of charge, $SOC_{init}$ represents the initial state of charge, $E_{accum}$ represents the accumulated load energy, $E_{total}$ represents the total load energy, and $SOC_{min}$ represents the minimum allowable state of charge.

16. A method as set forth in claim 9 further comprising calculating the reference state of charge from the following equation:

$$SOC_{ref} = SOC_{init} - \left[ \frac{E_{accum}}{E_{total}} \times (SOC_{init} - SOC_{min}) \right]$$

wherein $SOC_{ref}$ represents the reference state of charge, $SOC_{init}$ represents the initial state of charge, $E_{accum}$ represents the accumulated load energy, $E_{total}$ represents the total load energy, and $SOC_{min}$ represents the minimum allowable state of charge.

17. A vehicle as set forth in claim 14 wherein the controller is operable to calculate the reference state of charge from the following equation:

$$SOC_{ref} = SOC_{init} - \left[ \frac{E_{accum}}{E_{total}} \times (SOC_{init} - SOC_{min}) \right]$$

wherein $SOC_{ref}$ represents the reference state of charge, $SOC_{init}$ represents the initial state of charge, $E_{accum}$ represents the accumulated load energy, $E_{total}$ represents the total load energy, and $SOC_{min}$ represents the minimum allowable state of charge.

* * * * *